April 26, 1932.    A. F. VICTOR    1,855,269
VIEW FINDER AND LEVELER
Filed May 17, 1929
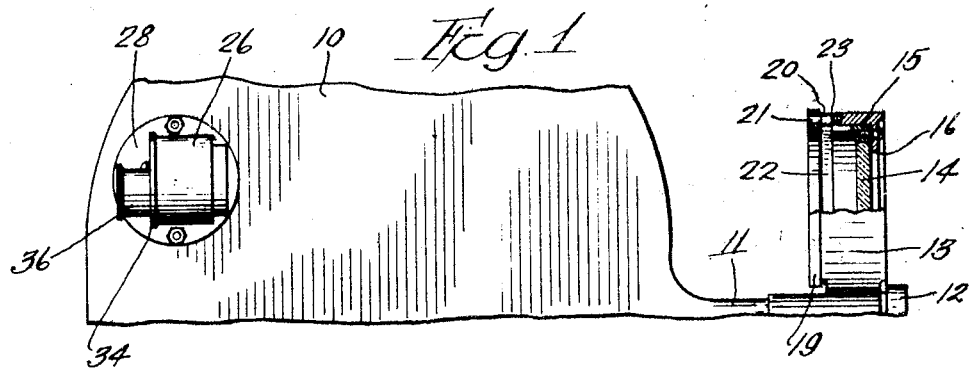
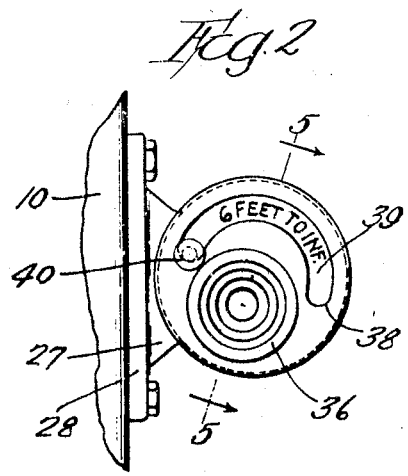
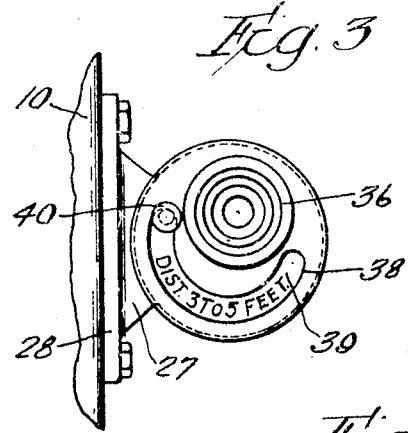
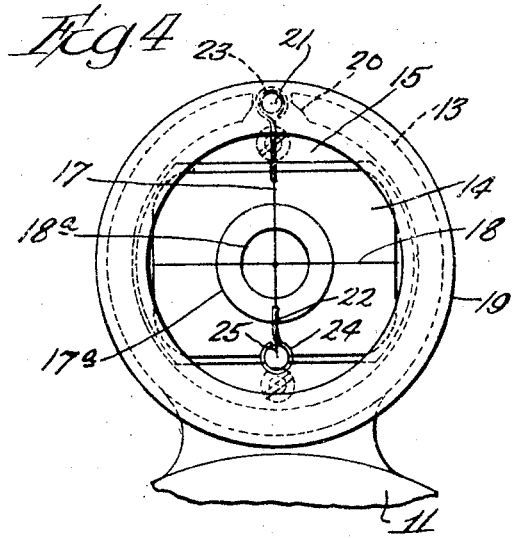
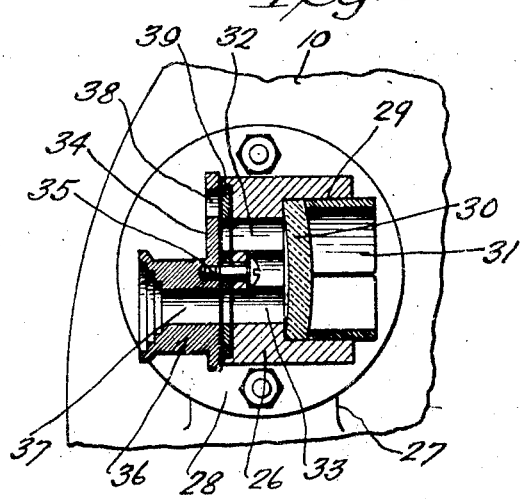
Inventor:
ALEXANDER FERDINAND VICTOR.

Patented Apr. 26, 1932

1,855,269

UNITED STATES PATENT OFFICE

ALEXANDER FERDINAND VICTOR, OF NEW YORK, N. Y.

VIEW FINDER AND LEVELER

Application filed May 17, 1929. Serial No. 363,766.

My present invention relates to view-finders such as are used in motion-picture cameras, and in connection therewith. I have also provided a leveling device by the use of which the operator may readily determine whether the camera is disposed in a true horizontal position.

In motion picture cameras for amateur use the photographic lens is usually constantly in focus or what is known as universal focus so that both near and distant objects may be photographed without adjustment of the lens, but in viewing the objects through the finder the objects near-by may be within range of the finder while the distant objects may be out of range and vice-versa, because of the convergence between the two axes. This also is due more or less to the fact that the camera is at different angles of inclination when viewing near and then viewing distant objects. Also amateur operators are liable to hold the camera in an unlevel position when taking the photographs with the result that the pictures when projected upon a screen will be tilted or distorted. In connection with the adjustable view-finder I have therefore arranged a leveling device which the operator may observe while looking through the view-finder and thus determine the position of the camera and maintain it in a level plane. The view-finder is constructed so that it may be readily adjusted to compensate differences in distances between the near and distant objects that are to be photographed. The device is novel in construction and is capable of being readily and dependably operated; it is made of sturdy parts in order to withstand hard usage; and it may be economically manufactured so that it will not materially increase the cost of producing the camera.

I prefer to carry out my invention and to accomplish the numerous objects thereof in substantially the manner hereinafter fully described and as more particularly pointed out in the claims, reference being herein made to the accompanying drawings that form a portion of this specification.

In the drawings:—

Figure 1 is a side elevation of a portion of a side of a motion-picture camera illustrating the application of my invention thereto.

Figure 2 is a front elevation of the compensating eye-piece of the finder drawn to an enlarged scale.

Figure 3 is a similar view of the eye-piece but moved to a different position.

Figure 4 is a front elevation of the lens holder and showing the pendulum level thereon.

Figure 5 is a longitudinal axial section of the eye-piece, the view being taken on line 5—5 of Figure 2 and looking in the direction indicated by the arrows.

The accompanying drawings are in a sense merely schematic for the purpose of illustrating a typical or preferred embodiment of my invention, and in said drawings I have used like reference characters to designate the same parts wherever they appear throughout the several views. In Figure 1, a portion of the camera housing is shown as consisting of a plate 10 forming one of the vertical side walls, only a part of which wall is shown and it is provided with a forwardly disposed extension 11 in which the photographic lens barrel 12 is mounted. On this extension there is secured a telescope or sight tube 13 within which there is positioned the lens 14 fitted in a frame 15 that is held in position by means of screws that pass through an internal flange 16 on the sight tube 13 near the forward end thereof and into the upper and lower portions of said frame. One of the surfaces of the lens is etched with a vertical line 17 and a horizontal line 18 similar to those on a surveyor's transit to indicate the planes of the respective axes of the lens, and at the center of the lens there are two concentric lines 17$^a$ and 18$^a$ to indicate the respective areas of different size photographic lenses that may be used, and said concentric lines may describe circles as shown, or may be polygonal. At the opposite end of the sight tube there is a ring 19 that is suitably secured to the edge of said tube and in the center of its upper portion a recess 20 is made through which a pivot pin 21 passes. This pin provides a pivot or fulcrum upon which a pendulum is swingingly mounted, which pendulum consists of a narrow strip of very thin metal that has its upper end portion formed into an eye 23 that is positioned in the recess 20 and has the pin 21 passed therethrough so that the pendulum is swingingly mounted at the rear of the sight tube and will always hang in a perpendicular plane back of the lens, whereby, when the same has been accurately positioned, it will aline with the vertical axis line 17 on the lens 14. In order to insure perpendicularity of the pendulum the lower portion of the metal strip is bent into a loop 24 that surrounds and holds a weight 25. The pendulum is free to swing in a given plane between the lens 14 and the eye-piece of the view-finder structure so that when the camera is being used the operator in observing the object to be photographed will also note the perpendicularity of the vertical axis line 17 with respect to the position of the pendulum and then may alter the position of the camera until the same is level.

The viewing element of the finder structure where the operator's eye is placed consists of a cylindrical block 26 on the end of a neck 27 extending laterally from a screw-plate 28 that is secured to the side wall 10 of the camera by bolts or the like. The axis of the block 26 is horizontal and it is centrally bored as at 29 for a portion of its length that is nearest the lens tube so as to receive a lens 30 that is maintained in the inner end of said bore by means of a slitted sleeve 31 that is frictionally pressed into the bore in front of the lens. The remaining portion of the block is provided with parallel upper and lower bores 32 and 33 respectively that form continuations of bore 29 and are both within the circumference of the other bore 29 and are eccentric to the axis of the block, and when viewed from their ends they will be seen to be in a plane slightly oblique to the vertical. A disk 34 is rotatably mounted at the adjacent end of the block, where the bores 32 and 33 terminate by means of a shouldered screw 35, and there is a lateral stub forming an eye-piece 36 projecting from the outer face of the disk eccentric to the axis of rotation of the latter. Both the eye-piece and the disk are provided with a bore 37 that is eccentric to the axis of rotation of the disk and which is adapted by rotating or changing the position of the eye-piece from a lower to an upper location, to be brought into alinement with the respective bores 32 and 33 of the block, and in either of these positions the operator may sight an object through the eye-piece, the lens 30 and through the other lens 14 of the view-finder. By using the eyepiece in one or other of these positions the structure automatically compensates for the difference in positions of near and distant objects to be photographed.

In order that the operator may readily determine the proper position in which the compensating eye-piece should be placed in viewing a given object I have provided the disk 34 with a window 38 of segmental shape and back of said disk is a stationary plate 39 bearing upon its face next the disk 34, in positions to be read through the window, the legends "Dist 3 to 5 feet" and "6 feet to inf". Thus when the eyepiece is in its upper position alining with bore 32 the compensating view-finder is properly related to the front lens 14 to view near objects that are from three to five feet from the camera and when so viewed the camera will be in proper position to photograph said objects upon the film. In the other or lower position the compensating view-finder will view objects located from six feet to infinity and the camera will be accurately positioned with relation to said objects to photograph them properly upon the film. The principle involved in this device embodies the employment of an eyepiece the body of which is provided with a plurality of viewing apertures or bores all of which are preferably eccentric to the axis of the body so that the "sight" through these apertures or bores will be at different angles relative to the axis of the photographic lens of the camera. In conjunction with the apertured or bored body there is provided a co-acting sight piece having a single aperture or bore, and this sight piece and body are so assembled as to permit of a relative movement between these parts so as to aline the aperture of the sight piece with the desired aperture or bore in the body, thus permitting the object being photographed to be viewed by the operator who may adjust the view-finder according to the distance it is estimated it may be from the camera.

The view-finder may be effectively and dependably constructed by omitting the lens from either or both of the sighting elements, and the rotatable or compensating apertured member (the disk 34 and eye-piece 36) may be similarly mounted at the tube 13. In connection with the leveling device it will be obvious the pendulum may be hung at any point within the range of the view finder which of course would place it in axial alinement with the elements of the telescope. The construction and arrangement I have herein disclosed is preferred by me because of the fact that it is better adapted for use in conjunction with a specific type of motion-picture camera.

The foregoing explanation is made solely for the purpose of description and no limitation therein contained should be read into the claims, but said claims should be construed as broadly as permissible in view of the prior art. Also it will be understood that the structure may be altered to permit the same to be used upon cameras of different types.

What I claim is:—

1. A view finder for cameras comprising a member having a plurality of longitudinal bores the axes of which are eccentric to the axis of said member, a rotatable disk concentrically mounted on an end of said member and having an eye-piece that is bored to register with the respective bores of said member, a lens associated with the bores of said member, and a second lens remote to and alined with said first lens, whereby objects may be viewed through the eye-piece and lenses when the bore of the eye-piece is registered with the respective bores of said members.

2. A view finder for cameras comprising a member having a plurality of separate longitudinal bores the axes of which are eccentric to the axis of said member, a rotatable disk concentrically mounted on an end of said member and having a segmental slot concentric to its axis of rotation, an eye-piece on said disk having a bore adapted to be registered with the respective bores of said member, a lens associated with the bores of said member, a second lens remote to and axially alined with the first lens, and a pin on the end of said member and engaged in the segmental slot of said disk to limit rotational movement of said disk, whereby the bore of said eye-piece is caused to register with respective bores of said member for viewing near and remote objects.

Signed at Chicago, in the county of Cook and State of Illinois, this 5th day of May, 1928.

ALEXANDER FERDINAND VICTOR.